(12) United States Patent
Fu et al.

(10) Patent No.: US 12,349,037 B2
(45) Date of Patent: Jul. 1, 2025

(54) DATA TRANSMISSION METHOD, SENDING DEVICE, AND STORAGE MEDIUM

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 393 days.

(21) Appl. No.: 17/817,244

(22) Filed: Aug. 3, 2022

(65) Prior Publication Data

US 2022/0386211 A1    Dec. 1, 2022

Related U.S. Application Data

(63) Continuation of application No. PCT/CN2020/084063, filed on Apr. 9, 2020.

(51) Int. Cl.
  *H04W 40/02*  (2009.01)
  *H04W 24/02*  (2009.01)
  *H04W 76/15*  (2018.01)

(52) U.S. Cl.
  CPC .......... *H04W 40/02* (2013.01); *H04W 24/02* (2013.01); *H04W 76/15* (2018.02)

(58) Field of Classification Search
  CPC ..... H04W 40/02; H04W 24/02; H04W 76/15; H04W 76/16; H04W 80/02; H04W 4/70; H04W 28/086; H04L 1/08

USPC .................................................. 370/328–330
  See application file for complete search history.

(56) References Cited

U.S. PATENT DOCUMENTS

| | | | |
|---|---|---|---|
| 2018/0309660 A1* | 10/2018 | Loehr | H04W 36/0066 |
| 2018/0310202 A1* | 10/2018 | Löhr | H04L 1/1874 |
| 2018/0324642 A1* | 11/2018 | Yu | H04W 36/0055 |
| 2019/0215719 A1 | 7/2019 | Wei et al. | |
| 2020/0178327 A1 | 6/2020 | Jiang | |
| 2020/0187297 A1 | 6/2020 | Jiang | |
| 2020/0228438 A1 | 7/2020 | Loehr et al. | |
| 2020/0252831 A1 | 8/2020 | Wei et al. | |
| 2020/0267793 A1* | 8/2020 | Sharma | H04W 28/02 |

(Continued)

FOREIGN PATENT DOCUMENTS

| CN | 107615809 A | 1/2018 |
|---|---|---|
| CN | 110475285 A | 11/2019 |

(Continued)

OTHER PUBLICATIONS

Supplementary European Search Report in the European application No. 20930145.6, mailed on Mar. 21, 2023. (14 pages).

(Continued)

*Primary Examiner* — Candal Elpenord
(74) *Attorney, Agent, or Firm* — PERKINS COIE LLP

(57) ABSTRACT

A data transmission method is provided. The method comprises: when a replication transmission state is deactivated, if a first condition is satisfied, a sending device transmits data on the basis of a separation transmission mode, or the sending device delivers the data to a main path or a separation auxiliary path. Also disclosed in the present application are another data transmission method, a sending device, and a storage medium.

12 Claims, 11 Drawing Sheets

(56) References Cited

U.S. PATENT DOCUMENTS

| | | | |
|---|---|---|---|
| 2021/0250139 A1* | 8/2021 | Zhang | .................. H04L 5/0091 |
| 2022/0286382 A1 | 9/2022 | Loehr et al. | |
| 2023/0110070 A1 | 4/2023 | Xiao | |

FOREIGN PATENT DOCUMENTS

| | | | |
|---|---|---|---|
| WO | 2019036861 A1 | 2/2019 | |
| WO | 2019036862 A | 2/2019 | |
| WO | 2021159305 A1 | 8/2021 | |
| WO | 2021185202 A1 | 9/2021 | |

OTHER PUBLICATIONS

Office Action of the Indian application No. 202217046405, issued on Nov. 8, 2023. 6 pages with English translation.

Second Office Action of the Chinese application No. 202210900109.5, issued on Nov. 7, 2023. 12 pages with English translation.

Decision of Rejection of the Chinese application No. 202210900109.5, issued on Mar. 13, 2024. 10 pages with English translation.

VIVO. "Reusing legacy MAC CE for multi-leg PDCP duplication" 3GPP TSG-RAN WG2 Meeting #109-e R2-2000498, Mar. 6, 2020 (Mar. 6, 2020), parts 1-3. 4 pages.

LG Electronics Inc. "Summary of e-mail discussion 108#52 on PDCP running CR for NR IIOT" 3GPP TSG-RAN WG2 Meeting #109; R2-2001280, Mar. 6, 2020 (Mar. 6, 2020), paragraphs 1-45. 45 pages.

International Search Report in the international application No. PCT/CN2020/084063, mailed on Dec. 31, 2020. 6 pages.

English translation of the Written Opinion of the International Search Authority in the international application No. PCT/CN2020/084063, mailed on Dec. 31, 2020. 7 pages.

3GPP TS 38.323 V16.0.0 (Mar. 2020), 3rd Generation Partnership Project; Technical Specification Group Radio Access Network; NR; Packet Data Convergence Protocol (PDCP) specification (Release 16). 37 pages.

3GPP TS 38.331 V16.0.0 (Mar. 2020), 3rd Generation Partnership Project; Technical Specification Group Radio Access Network; NR; Radio Resource Control (RRC) protocol specification(Release 16). 832 pages.

LG Electronics Inc. "Discussion on PDCP duplication enhancements" 3GPP TSG-RAN WG2 Meeting #109e R2-2002171 E-meeting, Feb. 24-Mar. 6, 2020. 11 pages.

Nokia, Nokia Shanghai Bell "New WID: Support of NR Industrial Internet of Things (IoT)" 3GPP TSG RAN Meeting #83 RP-190728 Shenzhen, China, Mar. 18-21, 2019. 6 pages.

3GPP TS 38.323 V16.4.0 (Jun. 2021), Technical Specification 3rd Generation Partnership Project; Technical Specification Group Radio Access Network; NR; Packet Data Convergence Protocol (PDCP) specification(Release 16). 40 pages.

3GPP TS 38.331 V16.5.0 (Jun. 2021), 3rd Generation Partnership Project; Technical Specification Group Radio Access Network; NR; Radio Resource Control (RRC) protocol specification(Release 16). 956 pages.

Supplementary Partial European Search Report in the European application No. 20930145.6, mailed on Dec. 23, 2022.

Huawei et al: "Discussion on PDCP duplication in L2 parameters", 3GPP Draft; R2-1808423 Clarification on PDCP Duplication in L2 Parameter, 3rd Generation Partnership Project (3GPP), Mobile Competence Centre; 650, Route Des Lucioles; F-06921 Sophia-Antipolis Cedex, vol. RAN WG2, No. Busan, Korea; May 21, 2018-May 25, 2018 May 11, 2018 (May 11, 2018), XP051519819. the whole document. 8 pages.

Samsung: "Reordering Problem at MCG Link Recovery", 3GPP Draft; R2-1911456 Reordering at MCG Failure Recovery, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Aug. 26, 2019-Aug. 30, 2019 Aug. 16, 2019 (Aug. 16, 2019), XP051769213. the whole document. 4 pages.

First Office Action of the European application No. 20930145.6, issued on Sep. 4, 2023. 6 pages.

First Office Action of the Chinese application No. 202210900109.5, issued on Jul. 26, 2023. 13 pages with English translation.

* cited by examiner

In response to that a third condition is satisfied, determining, by a sending device, that a leg corresponding to an RLC entity of a non-primary leg is a split secondary leg, or determining, by the sending device, that the RLC entity of the non-primary leg is a split secondary entity ⟶ S301

FIG. 4

Configuring, by a sending device, a duplication transmission state in response to that a fourth condition is satisfied — S401

FIG. 5

Configuring, by a sending device and in response to that a second condition is satisfied, a first threshold which is used for determining a data transmission mode for the sending device — S501

FIG. 6

DATA TRANSMISSION METHOD, SENDING DEVICE, AND STORAGE MEDIUM

CROSS-REFERENCE TO RELATED APPLICATION

This is a continuation application of International Patent Application No. PCT/CN2020/084063, filed on Apr. 9, 2020, entitled "DATA TRANSMISSION METHOD, SENDING DEVICE, AND STORAGE MEDIUM", the disclosure of which is hereby incorporated by reference in its entirety.

BACKGROUND

In the related art, a transmission behavior of a sending device is not clarified when a duplication transmission state is deactivated.

SUMMARY

The present disclosure relates to the technical field of wireless communication, and in particular to a data transmission method, a sending device and a storage medium. Embodiments of the present disclosure provide a data transmission method, a sending device and a storage medium, which clarify a transmission behavior of the sending device when a duplication transmission state is deactivated.

According to a first aspect of the present disclosure, there is provided a data transmission method, including the following operations. When a duplication transmission state is deactivated and in response to that a first condition is satisfied, a sending device transmits data based on a split transmission mode, or delivers the data to a primary leg or a split secondary leg.

According to a second aspect of the present disclosure, there is provided a data transmission method, including the following operation. In response to that a third condition is satisfied, a sending device determines that a leg corresponding to a radio link control (RLC) entity of a non-primary leg is a split secondary leg. The split secondary leg is used for split transmission.

According to a third aspect of the present disclosure, there is provided a data transmission method, including the following operation. A sending device configures a duplication transmission state in response to that a fourth condition is satisfied.

According to a fourth aspect of the present disclosure, there is provided a data transmission method, including the following operation. In response to that a second condition is satisfied, a sending device configures a first threshold which is used for determining a data transmission mode for the sending device.

According to a fifth aspect of the present disclosure, there is provided a sending device, including a sending unit. The sending unit is configured to, when a duplication transmission state is deactivated and in response to that a first condition is satisfied, transmit data based on a split transmission mode, or deliver the data to a primary leg or a split secondary leg.

According to a sixth aspect of the present disclosure, there is provided a sending device, including a second processing unit. The second processing unit is configured to, in response to that a third condition is satisfied, determine that a leg corresponding to an RLC entity of a non-primary leg is a split secondary leg, the split secondary leg being used for split transmission.

According to a seventh aspect of the present disclosure, there is provided a sending device, including a third processing unit. The third processing unit is configured to configure a duplication transmission state in response to that a fourth condition is satisfied.

According to an eighth aspect of the present disclosure, there is provided a sending device, including a fourth processing unit. The fourth processing unit is configured to, in response to that a second condition is satisfied, configure a first threshold which is used for determining a data transmission mode for the sending device.

According to a ninth aspect of the present disclosure, there is provided a sending device, including a processor and a memory having stored thereon a computer program executable by the processor. The processor is configured to execute operations of the data transmission methods executed by the abovementioned sending device, when executing the computer program.

According to a tenth aspect of the present disclosure, there is provided a chip. The chip includes a processor configured to call and execute a computer program from a memory, to enable a device mounted with the chip to execute the data transmission methods executed by the abovementioned sending device.

According to an eleventh aspect of the present disclosure, there is provided a storage medium, having stored thereon an executable program that, when executed by a processor, implements the data transmission methods executed by the abovementioned sending device.

According to a twelfth aspect of the present disclosure, there is provided a computer program product, including computer program instructions. The computer program instructions enable a computer to execute the data transmission methods executed by the abovementioned sending device.

According to a thirteenth aspect of the present disclosure, there is provided a computer program, enabling a computer to execute the data transmission methods executed by the abovementioned sending device.

BRIEF DESCRIPTION OF THE DRAWINGS

FIG. 4 is a schematic flowchart of another optional process of a data transmission method according to an embodiment of the present disclosure;

FIG. 5 is a schematic flowchart of still another optional process of a data transmission method according to an embodiment of the present disclosure;

FIG. 6 is a schematic flowchart of yet another optional process of a data transmission method according to an embodiment of the present disclosure;

DETAILED DESCRIPTION

In order to understand characteristics and technical contents of the embodiments of the present disclosure in more detail, implementation of the embodiments of the present disclosure is described in detail below with reference to the accompanying drawings which are for reference only and are not intended to limit the embodiments of the present disclosure.

Prior to describing the embodiments of the present disclosure in detail, brief descriptions are given as follows.

Industrial interest of Things (IIoT) introduces a concept of a Time sensitive network (TSN) network or TSC based on transmission requirements of service delay and reliability. In order to achieve a high reliability and low delay transmission effect of the service, a research direction of Data duplication and multi-connectivity is introduced, and a Duplication architecture including a combination of Dual Connectivity (DC) and Carrier Aggregation (CA) is determined, to further improve reliability of the service.

A bearer of the duplication may be configured with up to four transmission legs or RLC entities; here the bearer may include a DRB or a Signaling Radio Bearer (SRB). The duplication mechanism may be applicable to a CA scenario, or may be applicable to a scenario of DC and CA. It may be described as: Specify Packet Data Convergence Protocol (PDCP) duplication with up to 4 RLC entities configured by RRC in architectural combinations including CA only and NR-DC in combination with CA.

Data duplication is performed at a PDCP layer, and the same PDCP Protocol Data Unit (PDU) is mapped to different RLC entities respectively. Data duplication transmission is PDCP duplication transmission. Media Access Control (MAC) needs to transmit duplicated data of different RLC entities to different carriers. In this case, the number of corresponding RLC entities may be at least one, for example, the number of RLC entities is 1, 2, 3, 4, or the like.

Figure 1:
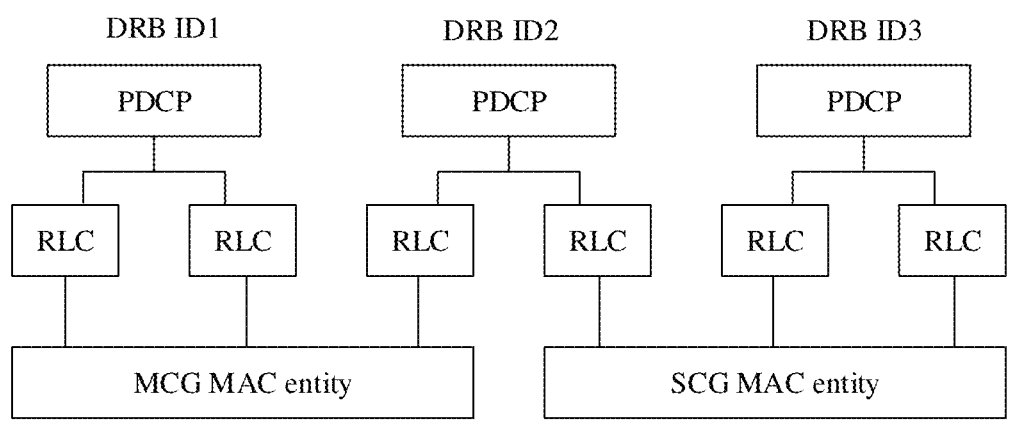
FIG. 1 is a schematic diagram of duplication transmission of a data radio bearer (DRB) according to the present disclosure.

With respect to the CA scenario, a solution supporting data duplication transmission utilizes a data duplication function of the PDCP, so that the duplicated PDCP PDUs may be transmitted to two RLC entities (i.e., two different logical channels) respectively, and finally the duplicated PDCP PDUs may be transmitted on different physical layer aggregated carriers, thereby achieving the purpose of frequency diversity gain and improving data transmission reliability, such as DRB ID1 and DRB ID3 illustrated in FIG. 1.

With respect to the DC scenario, a solution supporting data duplication transmission utilizes a data duplication function of the PDCP, so that the duplicated PDCP PDUs may be transmitted to two RLC entities (i.e., two different logical channels) respectively, and the two RLC entities correspond to different MAC entities respectively, such as DRB ID 2 illustrated in FIG. 1.

In Release 16 (Rel-16), a bearer of one duplication may be configured with up to four RLC entities. Rel-15 supports split transmission. In the Rel-15, when two RLC entities are configured and in response to that duplication is deactivated, the PDCP entity transmits PDCP PDUs by both a primary leg and a split secondary leg if a split transmission condition is satisfied. Otherwise, the PDCP PDUs are transmitted by the primary leg. A condition for split transmission is determined in accordance with a relationship between the amount of data waiting to be transmitted of the PDCP/RLC entity of the configured two RLC entities and a threshold.

In Rel-16, RAN2 agrees to configure the secondary leg for split transmission. Protocols of a current split bearer are described as follows.

When submitting a PDCP PDU to lower layer, the transmitting PDCP entity shall:
   if the transmitting PDCP entity is associated with one RLC entity:
   1) submit the PDCP PDU to the associated RLC entity;
   else, if the transmitting PDCP entity is associated with at least two RLC entities:
   2) if the PDCP duplication is activated:
     if the PDCP PDU is a PDCP Data PDU:
     duplicate the PDCP Data PDU and submit the PDCP Data PDU to the associated RLC entities activated for PDCP duplication; else:
     submit the PDCP Control PDU to the primary RLC entity;
   3) else:
     if the split secondary RLC entity is configured; and
     if the total amount of PDCP data volume and RLC data volume pending for initial transmission (as specified in TS 38.322 [5]) in the primary RLC entity and the split secondary RLC entity is equal to or larger than ul-DataSplitThreshold:
     submit the PDCP PDU to either the primary RLC entity or the split secondary RLC entity;
     else:
     submit the PDCP PDU to the primary RLC entity.

Descriptions of the split secondary RLC entity are as follows.

Split secondary RLC entity: in dual connectivity, the RLC entity other than the primary RLC entity which is responsible for split bearer operation.

With respect to PDCP configuration, an Information Element (IE) for PDCP-Config sets configurable PDCP parameters for SRB and DRB.

PDCP-Config Information Element

```
—         -- ASN1START
—         -- TAG-PDCP-CONFIG-START
—
—              PDCP-Config ::=      SEQUENCE {
—                  drb                  SEQUENCE {
—                  discardTimer             ENUMERATED {ms10, ms20, ms30, ms40, ms50, ms60,
ms75, ms100, ms150, ms200,
—                                             ms250, ms300, ms500, ms750, ms1500,
```

```
infinity}   OPTIONAL, -- Cond Setup
—                       pdcp-SN-SizeUL                      ENUMERATED {len12bits, len18bits}
OPTIONAL, -- Cond Setup2
—                       pdcp-SN-SizeDL                      ENUMERATED {len12bits, len18bits}
OPTIONAL, -- Cond Setup2
—                       headerCompression   CHOICE {
—                           notUsed                         NULL,
—                           rohc                            SEQUENCE {
—                               maxCID                          INTEGER (1..16383)
DEFAULT 15,
—                               profiles                        SEQUENCE {
—                                       profile0x0001   BOOLEAN,
—                                       profile0x0002   BOOLEAN,
—                                       profile0x0003   BOOLEAN,
—                                       profile0x0004   BOOLEAN,
—                                       profile0x0006   BOOLEAN,
—                                       profile0x0101   BOOLEAN,
—                                       profile0x0102   BOOLEAN,
—                                       profile0x0103   BOOLEAN,
—                                       profile0x0104   BOOLEAN
—                               },
—                               drb-ContinueROHC                ENUMERATED { true }
OPTIONAL   -- Need N
—                           },
—                           uplinkOnlyROHC                  SEQUENCE {
—                               maxCID                          INTEGER (1..16383)
DEFAULT 15,
—                               profiles                        SEQUENCE {
—                                   profile0x0006               BOOLEAN
—                               },
—                               drb-ContinueROHC                ENUMERATED { true }
OPTIONAL   -- Need N
—                           },
—                           ...,
—                       },
—                       integrityProtection                 ENUMERATED {   enabled   }
OPTIONAL,   -- Cond ConnectedTo5GC1
—                       statusReportRequired                ENUMERATED { true }
OPTIONAL,   -- Cond Rlc-AM
—                       outOfOrderDelivery                  ENUMERATED { true }
OPTIONAL   -- Need R
—                   }
                        OPTIONAL,   -- Cond DRB
—                       moreThanOneRLC          SEQUENCE {
—                           primaryPath             SEQUENCE {
—                               cellGroup                       CellGroupId
OPTIONAL,   -- Need R
—                               logicalChannel                  LogicalChannelIdentity
OPTIONAL   -- Need R
—                           },
—                           ul-DataSplitThreshold               UL-DataSplitThreshold
OPTIONAL, -- Cond SplitBearer
—                           pdcp-Duplication                    BOOLEAN
OPTIONAL   -- Need R
—                       }
                        OPTIONAL, -- Cond MoreThanOneRLC
—                       t-Reordering            ENUMERATED {
—                                                   ms0, ms1, ms2, ms4, ms5, ms8, ms10, ms15, ms20,
ms30, ms40,
—                                                   ms50, ms60, ms80, ms100, ms120, ms140, ms160,
ms180, ms200, ms220,
—                                                   ms240, ms260, ms280, ms300, ms500, ms750,
ms1000, ms1250,
—                                                   ms1500, ms1750, ms2000, ms2250, ms2500,
ms2750,
—                                                   ms3000, spare28, spare27, spare26, spare25, spare24,
—                                                   spare23, spare22, spare21, spare20,
—                                                   spare19, spare18, spare17, spare16, spare15, spare14,
—                                                   spare13, spare12, spare11, spare10, spare09,
—                                                   spare08, spare07, spare06, spare05, spare04, spare03,
—                                                   spare02, spare01 }
OPTIONAL, -- Need S
—                       ...,
—                       [[
—                       cipheringDisabled                   ENUMERATED {true}
OPTIONAL   -- Cond ConnectedTo5GC
—                       ]],
—                       [[
```

-continued

```
—             moreThanTwoRLC-r16           SEQUENCE {
—               splitSecondaryPath                        LogicalChannelIdentity
OPTIONAL,  -- Cond SplitBearer2
—               duplicationState             SEQUENCE (SIZE (3)) OF BOOLEAN
OPTIONAL   -- Need M
—             }
—             OPTIONAL,   -- Cond MoreThanTwoRLC
—             ethernetHeaderCompression-r16   CHOICE {
—               notUsed                    NULL,
—               ehc                        SEQUENCE {
—             ehc-Common SEQUENCE {
—               ehc-HeaderSize             ENUMERATED { byte1, byte2 },
—               ...
—             },
—             ehc-Downlink SEQUENCE {
—               drb-ContinueEHC-DL         ENUMERATED { true }
OPTIONAL,  -- Need N
—               ...
—             }                            OPTIONAL,   -- Need N
—             ehc-Uplink SEQUENCE {
—               drb-ContinueEHC-UL             ENUMERATED { true }
OPTIONAL,  -- Need N
—               ...
—             }
—             OPTIONAL,   -- Need N
—             ...
—             },
—             ...
—             }
—             OPTIONAL    -- Cond DRB
—           ]]
—
—         }
—
—         UL-DataSplitThreshold ::= ENUMERATED {
—             b0, b100, b200, b400, b800, b1600, b3200,
b6400, b12800, b25600, b51200, b102400, b204800,
—                                          b409600, b819200, b1228800, b1638400,
b2457600, b3276800, b4096000, b4915200, b5734400,
—                                          b6553600, infinity, spare8, spare7, spare6,
spare5, spare4, spare3, spare2, spare1 }
—
—                   -- TAG-PDCP-CONFIG-STOP
—                   -- ASN1STOP
```

In Rel-16, a radio bearer of one duplication may be configured with up to four RLC entities, but it does not clarify how the sending device performs data transmission and how to determine a split secondary leg when a duplication transmission state is deactivated; it does not clarify how to determine a current duplication transmission state when the duplication transmission state is not configured; furthermore, it does not clarify how to configure an uplink data split threshold (ul-Data Split Threshold).

Technical solutions of the embodiments of the present disclosure may be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, an NR system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), wireless fidelity (WiFi), next generation communication system or other communication systems, or the like.

System architectures and service scenarios described in the embodiments of the present disclosure are intended to describe the technical solutions of the embodiments of the present disclosure more clearly, and do not form a limitation to the technical solutions provided in the embodiments of the present disclosure. It may be known by those of ordinary skill in the art that the technical solutions provided in the embodiments of the present disclosure are also applicable to similar technical problems, with the evolution of network architectures and occurrence of new service scenarios.

A network device involved in the embodiments of the present disclosure may be a common base station (e.g., NodeB (NB) or evolutional NB (eNB) or gNB), an NR controller, a centralized unit, an NR base station, a radio remote module, a micro base station, a relay, a distributed unit, a transmission reception point (TRP), a transmission point (TP), or any other devices. Specific technologies and specific device forms used by the network device are not limited in the embodiments of the present disclosure. For convenience of description, in all the embodiments of the present disclosure, the abovementioned apparatuses providing a wireless communication function for a terminal device are collectively referred to as a network device.

In the embodiments of the present disclosure, the terminal device may be any terminal, for example, the terminal device may be a user equipment (UE) for machine type communication (MTC). That is, the terminal device may also be referred to as a UE, a mobile station (MS), a mobile terminal, a terminal, or the like, and the terminal device may communicate with one or more core networks via a radio access network (RAN), for example, the terminal device may be a mobile telephone (also referred to as a "cellular" telephone), a computer having a mobile terminal, or the like, for example, the terminal device may also be a portable, pocket-sized, hand-held, computer built-in or in-vehicle mobile device, which exchanges language and/or data with RAN. It is not specifically limited in the embodiments of the present disclosure.

In an embodiment, the network device and the terminal device may be deployed on land, including indoor or outdoor, hand-held or in-vehicle devices; they may also be deployed on a water surface; they may also be deployed on airplanes, balloons and satellites. Application scenarios of the network device and the terminal device are not limited in the embodiments of the present disclosure.

In an embodiment, communication between the network device and the terminal device and communication between the terminal device and other terminal devices may be performed through a licensed spectrum, or through an unlicensed spectrum, or through both a licensed spectrum and an unlicensed spectrum. The communication between the network device and the terminal device and the communication between the terminal device and other terminal devices may be performed through a spectrum below 7 gigahertz (GHz), or through a spectrum above 7 GHz, or through both a spectrum below 7 GHz and a spectrum above 7 GHz. Spectrum resources used between the network device and the terminal device are not limited in the embodiments of the present disclosure.

In general, the number of connections supported by a conventional communication system is limited and easy to implement. However, with the development of communication technologies, a mobile communication system will not only support conventional communication, but also support device to device (D2D) communication, machine to machine (M2M) communication, MTC, vehicle to vehicle (V2V) communication, or the like for example. The embodiments of the present disclosure may be applicable to these communication systems.

Figure 2:
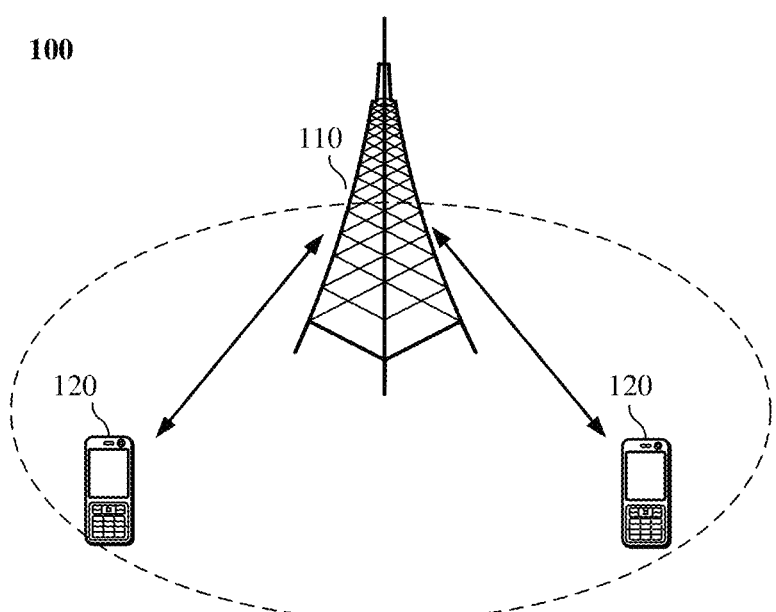
FIG. 2 is a schematic diagram of a composition structure of a communication system according to an embodiment of the present disclosure.

Exemplarily, a communication system 100 to which the embodiments of the present disclosure are applied is illustrated in FIG. 2. The communication system 100 may include a network device 110 which may be a device in communication with a terminal device 120 (also referred to as a communication terminal, a terminal). The network device 110 may provide communication coverage for a specific geographic area and may communicate with terminal devices within the coverage area. In an embodiment, the network device 110 may be a Base Transceiver Station (BTS) in a GSM system or a CDMA system, or may be a NB in a WCDMA system, or may be an eNB (or eNodeB) in an LTE system, or may be a wireless controller in a Cloud Radio Access Network (CRAN), or may be a mobile switching center, a relay station, an access point, an in-vehicle device, a wearable device, a hub, a switch, a bridge, a router, a network side device in a fifth-generation (5G) network, or a network device in a future evolutional Public Land Mobile Network (PLMN), or the like.

The communication system 100 also includes at least one terminal device 120 within the coverage of the network device 110. As used herein, "terminal device" includes, but is not limited to, connection via a wired line, such as a Public Switched Telephone Network (PSTN), a Digital Subscriber Line (DSL), a digital cable, a direct cable connection; and/or another data connection/network; and/or a wireless interface such as for a cellular network, a Wireless Local Area Network (WLAN), a digital television network such as a Digital Video Broadcasting Handheld (DVB-H) network, a satellite network, an AM-FM broadcast transmitter; and/or an apparatus of another terminal device configured to receive/transmit a communication signal; and/or an Internet of Things (IoT) device. The terminal device configured to communicate via the wireless interface may be referred to as "wireless communication terminal", "wireless terminal" or "mobile terminal". Examples of the mobile terminal include, but are not limited to, a satellite or cellular telephone; a Personal Communications System (PCS) terminal that may combine a cellular radiotelephone with data processing, facsimile, and data communication capabilities; a Personal Digital Assistant (PDA) that may include a radiotelephone, a pager, Internet/intranet access, a web browser, a notebook, a calendar, and/or a Global Positioning System (GPS) receiver; and a conventional laptop and/or palm type receiver, or other electronic devices including a radiotelephone transceiver. The terminal device may refer to an access terminal, UE, a subscriber unit, a subscriber station, a mobile station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a PDA, a hand-held device having a wireless communication function, a computing device, or other processing devices connected to a wireless modem, an in-vehicle device, a wearable device, a terminal device in a 5G network, or a terminal device in a future evolutional PLMN, or the like.

In an embodiment, D2D communication may be performed between the terminal devices 120.

In an embodiment, a 5G system or a 5G network may also be referred to as an NR system or an NR network.

One network device and two terminal devices are illustrated in FIG. 2 as an example. In an embodiment, the communication system 100 may include multiple network devices, and other numbers of terminal devices may be included within the coverage of each network device, which is not limited in the embodiments of the present disclosure.

In an embodiment, the communication system 100 may further include a network controller, a mobility management entity, and other network entities, which is not limited in the embodiments of the present disclosure.

It should be understood that a device having a communication function in the network/system in the embodiments of the present disclosure may be referred to as a communication device. Taking the communication system 100 illustrated in FIG. 2 as an example, the communication device may include a network device 110 and a terminal device 120 each having a communication function. The network device 110 and the terminal device 120 may be specific devices as described above, and are not elaborated here again. The communication device may further include other devices in the communication system 100, such as a network controller, a mobility management entity, and other network entities, which is not limited in the embodiments of the present disclosure.

Figure 3:
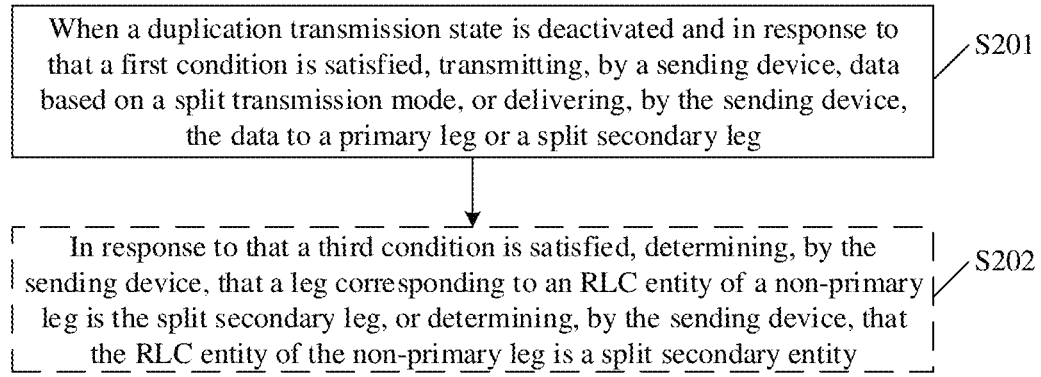
FIG. 3 is a schematic flowchart of an optional process of a data transmission method according to an embodiment of the present disclosure.

An optional processing flow of a data transmission method according to an embodiment of the present disclosure is illustrated in FIG. 3, which includes the following operations.

At S201, when a duplication transmission state is deactivated and in response to that a first condition is satisfied, a sending device transmits data based on a split transmission mode, or delivers the data to a primary leg or a split secondary leg.

In some embodiments, the leg may also be replaced with a noun such as an RLC entity or the like.

In some embodiments, the data may be a PDCP PDU.

In some embodiments, the operation of transmitting, by the sending device, data based on the split transmission mode may be that the sending device returns to the split transmission mode from the duplication transmission mode.

In some embodiments, the operation of delivering the data to the primary leg or the split secondary leg may be delivering the data to an RLC entity corresponding to the primary leg or an RLC entity corresponding to the split secondary leg.

In some embodiments, the first condition may include at least one of: a sum of an amount of PDCP data on the primary leg and the split secondary leg and an amount of RLC data waiting for initial transmission is greater than or equal to a first threshold; the split secondary leg is configured; a PDCP entity is associated with two RLC entities, and the two RLC entities correspond to different cell groups; the split secondary leg is not configured, a PDCP entity is associated with two PLC entities, and the two RLC entities correspond to different cell groups; the split secondary leg is configured, and duplication transmission of more than two RLC entities is configured; the split secondary leg is configured, and an IE for more than two RLC entities is configured or present; more than two RLC entities are not configured; the IE for more than two RLC entities is not configured or present; less than or equal to two RLC entities are configured; the split secondary leg is not configured, and an IE for more than one RLC entity is configured or present; the first threshold is configured; or a PDCP entity is associated with at least two RLC entities, and the at least two RLC entities correspond to different cell groups.

According to the embodiment of the present disclosure, it is clarified that when the duplication transmission state is deactivated, the transmission behavior of the sending device may be returning to the split transmission mode from the duplication transmission mode, or delivering the data to the primary leg or the split secondary leg.

With respect to the transmission behavior of the sending device when the duplication transmission state is deactivated, the corresponding protocol may be modified to read:

When submitting a PDCP PDU to lower layer, the transmitting PDCP entity shall:

if the transmitting PDCP entity is associated with one RLC entity:
1) submit the PDCP PDU to the associated RLC entity;
else, if the transmitting PDCP entity is associated with at least two RLC entities:
2) if the PDCP duplication is activated:
  if the PDCP PDU is a PDCP Data PDU:
    duplicate the PDCP Data PDU and submit the PDCP Data PDU to the associated RLC entities activated for PDCP duplication;
  else:
    submit the PDCP Control PDU to the primary RLC entity;
3) else:
  if the total amount of PDCP data volume and RLC data volume pending for initial transmission (as specified in TS 38.322 [5]) in the primary RLC entity and the split secondary RLC entity is equal to or larger than ul-DataSplitThreshold; and:
  if the split secondary RLC entity is configured; or
  if the transmitting PDCP entity is associated with two RLC entities and the two associated RLC entities belong to the different Cell Groups:
    submit the PDCP PDU to either the primary RLC entity or the split secondary RLC entity;
  else:
    submit the PDCP PDU to the primary RLC entity.

In some embodiments, the first threshold is configured when a second condition is satisfied. The second condition may include at least one of: the PDCP entity is associated with at least two RLC entities, and the at least two RLC entities correspond to different cell groups; a configured bearer is a split bearer; the IE for more than two RLC entities is configured or present; duplication transmission of more than two RLC entities is configured; the split secondary leg is configured; configuration condition for the first threshold includes a split bearer SplitBearer2; at least two of RLC entities associated with the PDCP entity correspond to different cell groups; a radio bearer is associated with more than two RLC entities, and the RLC entities correspond to different cell groups; a radio bearer is associated with at least two RLC entities, and the RLC entities correspond to different cell groups; configuration condition for the first threshold includes a split bearer, and description of the split bearer includes that a radio bearer is associated with at least two RLC entities and the RLC entities correspond to different cell groups; or configuration condition for the first threshold includes a split bearer, and description of the split bearer includes that a radio bearer is associated with more than one RLC entity or more than two RLC entities and that the RLC entities correspond to different cell groups. Here the radio bearer may be a DRB and/or an SRB.

In some embodiments, the first threshold may be a ul-Data Split Threshold.

It should be noted that in the embodiment of the present disclosure, the first threshold may be configured when the second condition is satisfied; and the data transmission state has no effect on configuration of the first threshold. It may be understood that the first threshold is configured as long as the second condition is satisfied, no matter with respect to the data duplication or the data split transmission.

Therefore, the configuration condition for the ul-Data Split Threshold is clarified by the embodiment of the present disclosure.

With respect to the configuration condition for the ul-Data Split Threshold in the embodiment of the present disclosure, the description of existing ul-Data Split Threshold may be modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field can be present, if moreThanTwoRLC is configured.

Alternatively, the description of ul-Data Split Threshold is modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field is optional present, if moreThanTwoRLC is configured.

Alternatively, the description of ul-Data Split Threshold is modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field is optional present, if more than one RLC entities are configured.

Alternatively, the description of Split Bearer is modified to read:

The field is absent for SRBs. Otherwise, the field is optional present, need M, in case of radio bearer with more than one associated RLC mapped to different cell groups, or in case of radio bearer with more than two associated RLC mapped to different cell groups.

Alternatively, the description of Split Bearer is modified to read: The field is absent for SRBs. Otherwise, the field is optional present, need M, in case of radio bearer with at least two associated RLC mapped to different cell groups.

In some embodiments, the data transmission method may further include the following operations.

At S202: in response to that a third condition is satisfied, the sending device determines that a leg corresponding to an RLC entity of a non-primary leg is the split secondary leg, or determines that the RLC entity of the non-primary leg is a split secondary entity.

In some embodiments, the third condition may include at least one of: more than two RLC entities are not configured; an IE for more than two RLC entities is not configured or present; duplication transmission of more than two RLC entities is not configured; duplication transmission of two RLC entities is configured; the first threshold is configured; a radio bearer is a split bearer; an IE for a split bearer is present or configured; PDCP duplication transmission is performed based on dual connectivity (DC); or a split bearer is associated with two RLC entities.

Furthermore, the radio bearer may be a DRB.

In some embodiments, the two RLC entities correspond to different cell groups, or at least two RLC entities correspond to different cell groups.

With respect to the scenario in which the sending device determines that the leg corresponding to the RLC entity of the non-primary leg is the split secondary leg when the duplication transmission state is a deactivation state, domain configuration of PrimaryPath IE may be modified to read:

primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If more-ThanTwoRLC is not configured, the RLC entity other than primary leg is split secondary RLC entity.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If more-ThanTwoRLC is absent, the RLC entity other than primary path is split secondary RLC entity.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If more-ThanTwoRLC is not configured, the RLC entity other than primary path is split secondary RLC entity for split bearers.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If more-ThanTwoRLC is absent, the RLC entity other than primary path is split secondary RLC entity for split bearers.

Alternatively, definition of the split secondary RLC entity in the 38.323 protocol is modified to read:

Split secondary RLC entity: in dual connectivity, the RLC entity other than the primary RLC entity which is responsible for split bearer operation. The RLC entity other than primary path is split secondary RLC entity for split bearers associated with two RLC entities.

In some embodiments, the data transmission method may further include the following operation.

The duplication transmission state is configured or present in response to that a fourth condition is satisfied.

In some embodiments, the fourth condition may include at least one of: an IE for more than two RLC entities is configured or present; duplication transmission of more than two RLC is configured; a configured radio bearer is associated with at least two RLC entities; or a configured radio bearer is associated with at least one RLC entity.

The foregoing embodiments describe that the data duplication is in a deactivation state. In a specific implementation, when the duplication transmission state is not present or configured, the duplication transmission state being a deactivation state may be existed in at least one of the following scenarios: an initial PDCP duplication transmission state of the RLC entity associated with a DRB is a deactivation state; the initial PDCP duplication transmission state of the RLC entity associated with a DRB is a deactivation state when the duplication transmission state is not present or configured; an initial PDCP duplication transmission state of an associated RLC entity is a deactivation state when the duplication transmission state is not present or configured; the initial PDCP duplication transmission state of the RLC entity associated with a DRB is a deactivation state, when the duplication transmission state is not present or configured and an IE for more than two RLC entities is present or configured; the initial PDCP duplication transmission state of the associated RLC entity is a deactivation state, when the duplication transmission state is not present or configured and the IE for more than two RLC entities is present or configured; the initial PDCP duplication transmission state of the RLC entity associated with a DRB is a deactivation state, when the duplication transmission state is not present or configured and duplication transmission of more than two RLC entities is configured; the initial PDCP duplication transmission state of the associated RLC entity is a deactivation state, when the duplication transmission state is not present or configured and duplication transmission of more than two RLC entities is configured.

Alternatively, the foregoing embodiments describe that the data duplication is in a deactivation state. In a specific implementation, when the duplication transmission state is not present or configured, the duplication transmission state being a activation state may be existed in at least one of the following scenarios: an initial PDCP duplication transmission state of the RLC entity associated with a SRB is a activation state; the initial PDCP duplication transmission state of the RLC entity associated with a SRB is a activation state when the duplication transmission state is not present or configured; an initial PDCP duplication transmission state of an associated RLC entity is a activation state when the duplication transmission state is not present or configured; the initial PDCP duplication transmission state of the RLC entity associated with a SRB is a activation state, when the duplication transmission state is not present or configured and an IE for more than two RLC entities is present or configured; the initial PDCP duplication transmission state of the associated RLC entity is a activation state, when the duplication transmission state is not present or configured, and the IE for more than two RLC entities is present or configured; the initial PDCP duplication transmission state of the RLC entity associated with a SRB is a activation state, when the duplication transmission state is not present or configured and duplication transmission of more than two RLC entities is configured; the initial PDCP duplication transmission state of the associated RLC entity is a activation state, when the duplication transmission state is not present or configured and duplication transmission of more than two RLC entities is configured.

With respect to the scenario in which the duplication transmission state is a deactivation state, domain configuration of duplicationState IE may be modified to read:

duplicationState

This field indicates the initial uplink PDCP duplication state for the associated RLC entities. If set to true, the initial PDCP duplication state is activated for the associated RLC entity. The index for the indication is determined by ascending order of logical channel ID of all RLC entities other than the primary RLC entity indicated by primaryPath in the order of MCG and SCG, as in clause 6.1.3.Y of TS 38.321 [3]. If the number of associated RLC entities other than the primary RLC entity is two, UE ignores the value in the largest index of this field. If the field is absent, the initial PDCP duplication state of the associated RLC entity is deactivated for DRB. The initial PDCP duplication state of the associated RLC entity is always activated for SRB.

or further, duplicationState

This field indicates the initial uplink PDCP duplication state for the associated RLC entities. If set to true, the initial PDCP duplication state is activated for the associated RLC entity. The index for the indication is determined by ascending order of logical channel ID of all RLC entities other than the primary RLC entity indicated by primaryPath in the order of MCG and SCG, as in clause 6.1.3.Y of TS 38.321 [3]. If the number of associated RLC entities other than the primary RLC entity is two, UE ignores the value in the largest index of this field. If the field is absent, the initial PDCP duplication state of the associated RLC entity is deactivated for DRB. If the field is absent, the initial PDCP duplication state of the associated RLC entity is activated for SRB. The initial PDCP duplication state of the associated RLC entity is always activated for SRB.

Another optional processing flow of a data transmission method according to an embodiment of the present disclosure is illustrated in FIG. 4, which may include the following operations.

At S301, in response to that a third condition is satisfied, a sending device determines that a leg corresponding to an RLC entity of a non-primary leg is a split secondary leg, or determines that the RLC entity of the non-primary leg is a split secondary entity. The split secondary leg is used for split transmission.

In some embodiments, the third condition may include at least one of: more than two RLC entities are not configured; an IE for more than two RLC entities is not configured or present; duplication transmission of more than two RLC entities is not configured; duplication transmission of two RLC entities is configured; the first threshold is configured; a radio bearer is a split bearer; an IE for a split bearer is present or configured; PDCP duplication transmission is performed based on DC; or a split bearer is associated with two RLC entities.

Furthermore, the radio bearer may be a DRB.

In some embodiments, the two RLC entities correspond to different cell groups; or, at least two RLC entities correspond to different cell groups.

With respect to the scenario in which the sending device determines that the leg corresponding to the RLC entity of the non-primary leg is the split secondary leg when the duplication transmission state is a deactivation state, domain configuration of PrimaryPath IE may be modified to read:

primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If moreThanTwoRLC is not configured, the RLC entity other than primary path is split secondary RLC entity.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If moreThanTwoRLC is absent, the RLC entity other than primary path is split secondary RLC entity.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If moreThanTwoRLC is not configured, the RLC entity other than primary path is split secondary RLC entity for split bearers.

or primaryPath

Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs. The NW indicates cellGroup for split bearers using logical channels in different cell groups. The NW indicates logicalChannel for CA based PDCP duplication, i.e., if both logical channels terminate in the same cell group. If moreThanTwoRLC is absent, the RLC entity other than primary path is split secondary RLC entity for split bearers.

Alternatively, definition of the split secondary RLC entity in the 38.323 protocol is modified to read:

Split secondary RLC entity: in dual connectivity, the RLC entity other than the primary RLC entity which is responsible for split bearer operation. The RLC entity other than primary path is split secondary RLC entity for split bearers associated with two RLC entities.

Still another optional processing flow of a data transmission method according to an embodiment of the present disclosure is illustrated in FIG. 5, which may include the following operation.

At S401, a sending device configures a duplication transmission state in response to that a fourth condition is satisfied.

In some embodiments, the fourth condition may include at least one of: an IE for more than two RLC entities is configured or present; duplication transmission of more than two RLC is configured; a configured radio bearer is associated with at least two RLC entities; or a configured radio bearer is associated with at least one RLC entity.

The foregoing embodiments describe that the data duplication is in a deactivation state. In a specific implementation, when the duplication transmission state is not present or configured, the duplication transmission state being a deactivation state may be existed in at least one of the following scenarios: an initial PDCP duplication transmission state of the RLC entity associated with a DRB is a deactivation state; the initial PDCP duplication transmission state of the RLC entity associated with a DRB is a deactivation state when the duplication transmission state is not present or configured; an initial PDCP duplication transmission state of an associated RLC entity is a deactivation state when the duplication transmission state is not present or configured; the initial PDCP duplication transmission state of the RLC entity associated with a DRB is a deactivation state when the duplication transmission state is not present or configured, and an IE for more than two RLC entities is present or configured; the initial PDCP duplication transmission state of the associated RLC entity is a deactivation state when the duplication transmission state is not present or configured and the IE for more than two RLC entities is present or configured; the initial PDCP duplication transmission state of the RLC entity associated with a DRB is a deactivation state when the duplication transmission state is not present or configured and duplication transmission of more than two RLC entities is configured; the initial PDCP duplication transmission state of the associated RLC entity is a deactivation state when the duplication transmission state is not present or configured and duplication transmission of more than two RLC entities is configured.

Alternatively, the foregoing embodiments describe that the data duplication is in a deactivation state. In a specific implementation, when the duplication transmission state is not present or configured, the duplication transmission state being a activation state may be existed in at least one of the following scenarios: an initial PDCP duplication transmission state of the RLC entity associated with a SRB is a activation state; the initial PDCP duplication transmission state of the RLC entity associated with a SRB is a activation state when the duplication transmission state is not present or configured; an initial PDCP duplication transmission state of an associated RLC entity is a activation state when the duplication transmission state is not present or configured; the initial PDCP duplication transmission state of the RLC entity associated with a SRB is a activation state when the duplication transmission state is not present or configured and an IE for more than two RLC entities is present or configured; the initial PDCP duplication transmission state of the associated RLC entity is a activation state when the duplication transmission state is not present or configured and the IE for more than two RLC entities is present or configured; the initial PDCP duplication transmission state of the RLC entity associated with a SRB is a activation state when the duplication transmission state is not present or configured and duplication transmission of more than two RLC entities is configured; the initial PDCP duplication transmission state of the associated RLC entity is a activation state when the duplication transmission state is not present or configured and duplication transmission of more than two RLC entities is configured.

With respect to the scenario in which the duplication transmission state is a deactivation state, domain configuration of duplicationState IE may be modified to read:

duplicationState

This field indicates the initial uplink PDCP duplication state for the associated RLC entities. If set to true, the initial PDCP duplication state is activated for the associated RLC entity. The index for the indication is determined by ascending order of logical channel ID of all RLC entities other than the primary RLC entity indicated by primaryPath in the order of MCG and SCG, as in clause 6.1.3.Y of TS 38.321 [3]. If the number of associated RLC entities other than the primary RLC entity is two, UE ignores the value in the largest index of this field. If the field is absent, the initial PDCP duplication state of the associated RLC entity is deactivated for DRB. The initial PDCP duplication state of the associated RLC entity is always activated for SRB.

or further, duplicationState

This field indicates the initial uplink PDCP duplication state for the associated RLC entities. If set to true, the initial PDCP duplication state is activated for the associated RLC entity. The index for the indication is determined by ascending order of logical channel ID of all RLC entities other than the primary RLC entity indicated by primaryPath in the order of MCG and SCG, as in clause 6.1.3.Y of TS 38.321 [3]. If the number of associated RLC entities other than the primary RLC entity is two, UE ignores the value in the largest index of this field. If the field is absent, the initial PDCP duplication state of the associated RLC entity is deactivated for DRB. If the field is absent, the initial PDCP duplication state of the associated RLC entity is activated for SRB. The initial PDCP duplication state of the associated RLC entity is always activated for SRB.

Yet another optional processing flow of a data transmission method according to an embodiment of the present disclosure is illustrated in FIG. 6, which may include the following operation.

At S501, in response to that a second condition is satisfied, a sending device configures a first threshold which is used for determining a data transmission mode for the sending device.

In some embodiments, the second condition may include at least one of: a PDCP entity is associated with at least two RLC entities, and the at least two RLC entities correspond to different cell groups; a configured bearer is a split bearer; the IE for more than two RLC entities is configured or present; duplication transmission of more than two RLC entities is configured; a split secondary leg is configured; configuration condition for the first threshold includes a split bearer SplitBearer2; at least two of RLC entities associated with the PDCP entity correspond to different cell groups; a radio bearer is associated with more than two RLC entities, and the RLC entities correspond to different cell groups; a radio bearer is associated with at least two RLC entities, and the RLC entities correspond to different cell groups; configuration condition for the first threshold includes a split bearer, and description of the split bearer includes a radio bearer associated with at least two RLC entities and the RLC entities corresponding to different cell groups; or configuration condition for the first threshold includes a split bearer, and description of the split bearer includes a radio bearer associated with more than one RLC entity or more than two RLC entities, and the RLC entities corresponding to different cell groups. Here the radio bearer may be a DRB and/or an SRB.

In some embodiments, the data transmission mode includes at least one of a duplication transmission mode or a split transmission mode.

In some embodiments, the first threshold may be a ul-Data Split Threshold.

It should be noted that in the embodiment of the present disclosure, the first threshold may be configured when the second condition is satisfied; and the data transmission state has no effect on configuration of the first threshold. It may be understood that the first threshold is configured as long as the second condition is satisfied, no matter for the data duplication transmission or the data split transmission.

Therefore, the configuration condition for the ul-Data Split Threshold is clarified by the embodiment of the present disclosure.

With respect to the configuration condition for the ul-Data Split Threshold in the embodiment of the present disclosure, the description of existing ul-Data Split Threshold may be modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field can be present, if moreThanTwoRLC is configured.

Alternatively, the description of ul-Data Split Threshold is modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field is optional present, if moreThanTwoRLC is configured.

Alternatively, the description of ul-Data Split Threshold is modified to read:

Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied. This field is optional present, if more than one RLC entities are configured.

Alternatively, the description of Split Bearer is modified to read: The field is absent for SRBs. Otherwise, the field is optional present, need M, in case of radio bearer with more than one associated RLC mapped to different cell groups, or in case of radio bearer with more than two associated RLC mapped to different cell groups.

Alternatively, the description of Split Bearer is modified to read: The field is absent for SRBs. Otherwise, the field is optional present, need M, in case of radio bearer with at least two associated RLC mapped to different cell groups.

It should be noted that the main leg or the split secondary leg described in the embodiments of the present disclosure may be an RLC entity. For example, delivering data to the primary leg may be understood as delivering the data to an RLC entity corresponding to the primary leg; delivering the data to the split secondary leg may be understood as delivering the data to an RLC entity corresponding to the split secondary leg. Alternatively, delivering data to the primary leg may be understood as delivering the data to the primary RLC entity; delivering the data to the split secondary leg may be understood as delivering the data to the split secondary RLC entity.

It should be understood that in various embodiments of the present disclosure, sizes of serial numbers of the processes as described above do not mean the order of execution, and the order of execution of the processes should be determined by their functions and internal logic, and should not form any limitation on implementation of the embodiments of the present disclosure.

Figure 7:
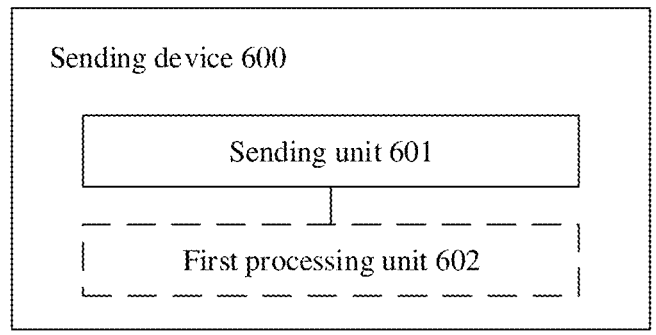
FIG. 7 is a schematic diagram of an optional composition structure of a sending device according to an embodiment of the present disclosure.

In order to implement the abovementioned data transmission methods, an embodiment of the present disclosure provides a sending device. A schematic diagram of an optional composition structure of the sending device 600 is illustrated in FIG. 7, including a sending unit 601.

The sending unit 601 is configured to, when a duplication transmission state is deactivated and in response to that a first condition is satisfied, transmit data based on a split transmission mode, or deliver the data to a primary leg or a split secondary leg.

In some embodiments, the first condition may include at least one of: a sum of an amount of PDCP data on the primary leg and the split secondary leg and an amount of RLC data waiting for initial transmission is greater than or equal to a first threshold; the split secondary leg is configured; a PDCP entity is associated with two RLC entities, and the two RLC entities correspond to different cell groups; the split secondary leg is not configured, a PDCP entity is associated with two PLC entities, and the two RLC entities correspond to different cell groups; the split secondary leg is configured, and duplication transmission of more than two RLC entities is configured; the split secondary leg is configured, and an IE for more than two RLC entities is configured or present; more than two RLC entities are not configured; the IE for more than two RLC entities is not configured or present; less than or equal to two RLC entities are configured; the split secondary leg is not configured, and an IE for more than one RLC entity is configured or present; the first threshold is configured; or a PDCP entity is associated with at least two RLC entities, and the at least two RLC entities correspond to different cell groups.

In some embodiments, the first threshold is configured when a second condition is satisfied.

In some embodiments, the second condition may include at least one of: the PDCP entity is associated with at least two RLC entities, and the at least two RLC entities correspond to different cell groups; a configured bearer is a split bearer; the IE for more than two RLC entities is configured or present; duplication transmission of more than two RLC entities is configured; the split secondary leg is configured; configuration condition for the first threshold includes a split bearer SplitBearer2; at least two of RLC entities associated with the PDCP entity correspond to different cell groups; a radio bearer is associated with more than two RLC entities, and the RLC entities correspond to different cell groups; a radio bearer is associated with at least two RLC entities, and the RLC entities correspond to different cell groups; configuration condition for the first threshold includes a split bearer, and description of the split bearer includes a radio bearer associated with at least two RLC entities, and the RLC entities corresponding to different cell groups; or configuration condition for the first threshold includes a split bearer, and description of the split bearer includes a radio bearer associated with more than one entity or more than two RLC entities, and the RLC entities corresponding to different cell groups.

In some embodiments, the first threshold includes a ul-Data split threshold.

In some embodiments, the sending device may further include a first processing unit 602.

The first processing unit 602 is configured to, in response to that a third condition is satisfied, determine that a leg corresponding to an RLC entity of a non-primary leg is the split secondary leg.

In some embodiments, the third condition may include at least one of: more than two RLC entities are not configured; an IE for more than two RLC entities is not configured or present; duplication transmission of more than two RLC entities is not configured; duplication transmission of two RLC entities is configured; the first threshold is configured; a radio bearer is a split bearer; an IE for a split bearer is present or configured; PDCP duplication transmission is performed based on DC; or a split bearer is associated with two RLC entities. Here the radio bearer may be a DRB.

In some embodiments, the two RLC entities correspond to different cell groups, or at least two RLC entities correspond to different cell groups.

In some embodiments, the duplication transmission state is configured or present when a fourth condition is satisfied.

In some embodiments, the fourth condition may include at least one of: an IE for more than two RLC entities is configured or present; duplication transmission of more than two RLC is configured; a configured radio bearer is associated with at least two RLC entities; or a configured radio bearer is associated with at least one RLC entity.

In some embodiments, an initial PDCP duplication transmission state of an RLC entity associated with a DRB is a deactivation state when the duplication transmission state is not present or configured; an initial PDCP duplication transmission state of an associated RLC entity is a deactivation state when the duplication transmission state is not present or configured; an initial PDCP duplication transmission state of an RLC entity associated with a DRB is a deactivation state when the duplication transmission state is not present or configured and an IE for more than two RLC entities is present or configured; an initial PDCP duplication transmission state of an associated RLC entity is a deactivation state when the duplication transmission state is not present or configured and the IE for more than two RLC entities is present or configured; an initial PDCP duplication transmission state of an RLC entity associated with a DRB is a deactivation state when the duplication transmission state is not present or configured and duplication transmission of more than two RLC entities is configured; and an initial PDCP duplication transmission state of an associated RLC entity is a deactivation state when the duplication transmission state is not present or configured and duplication transmission of more than two RLC entities is configured.

Figure 8:
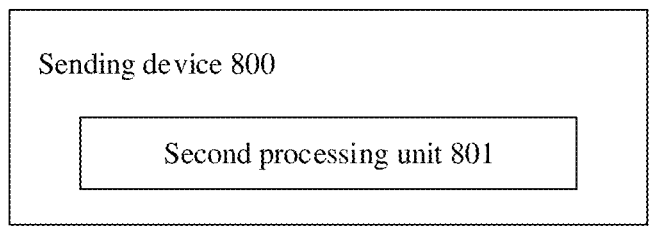
FIG. 8 is a schematic diagram of another optional composition structure of a sending device according to an embodiment of the present disclosure.

In order to implement the abovementioned data transmission methods, an embodiment of the present disclosure provides a sending device. A schematic structural diagram of another optional composition of the sending device 800 is illustrated in FIG. 8, including a second processing unit 801.

The second processing unit 801 is configured to, in response to that a third condition is satisfied, determine that a leg corresponding to an RLC entity of a non-primary leg is a split secondary leg. Here the split secondary leg is used for split transmission.

In some embodiments, the third condition may include at least one of: more than two RLC entities are not configured; an IE for more than two RLC entities is not configured or present; duplication transmission of more than two RLC entities is not configured; duplication transmission of two RLC entities is configured; the first threshold is configured; a radio bearer is a split bearer; an IE for a split bearer is present or configured; PDCP duplication transmission is performed based on DC; or a split bearer is associated with two RLC entities. Here the radio bearer may be a DRB.

In some embodiments, the two RLC entities correspond to different cell groups; or, at least two RLC entities correspond to different cell groups.

Figure 9:
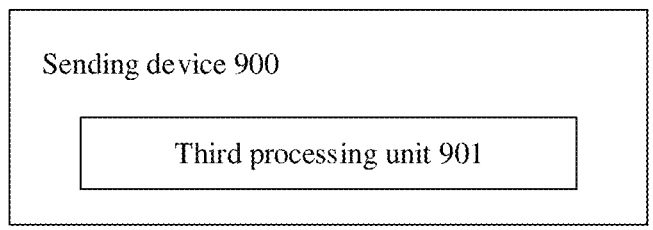
FIG. 9 is a schematic diagram of still another optional composition structure of a sending device according to an embodiment of the present disclosure.

In order to implement the abovementioned data transmission methods, an embodiment of the present disclosure provides a sending device. A schematic structural diagram of still another optional composition of the sending device 900 is illustrated in FIG. 9, including a third processing unit 901.

The third processing unit 901 is configured to configure a duplication transmission state in response to that a fourth condition is satisfied.

In some embodiments, the fourth condition may include at least one of: an IE for more than two RLC entities is configured or present; duplication transmission of more than two RLC entities is configured; a configured radio bearer is associated with at least two RLC entities; or a configured radio bearer is associated with at least one RLC entity.

In some embodiments, an initial PDCP duplication transmission state of an RLC entity associated with a DRB is a deactivation state when the duplication transmission state is not present or configured; an initial PDCP duplication transmission state of an associated RLC entity is a deactivation state when the duplication transmission state is not present or configured; an initial PDCP duplication transmission state of an RLC entity associated with a DRB is a deactivation state when the duplication transmission state is not present or configured and an IE for more than two RLC entities is present or configured; an initial PDCP duplication transmission state of an associated RLC entity is a deactivation state when the duplication transmission state is not present or configured and the IE for more than two RLC entities is present or configured; an initial PDCP duplication transmission state of an RLC entity associated with a DRB is a deactivation state when the duplication transmission state is not present or configured and duplication transmission of more than two RLC entities is configured; and an initial PDCP duplication transmission state of an associated RLC entity is a deactivation state when the duplication transmission state is not present or configured and duplication transmission of more than two RLC entities is configured.

Figure 10:
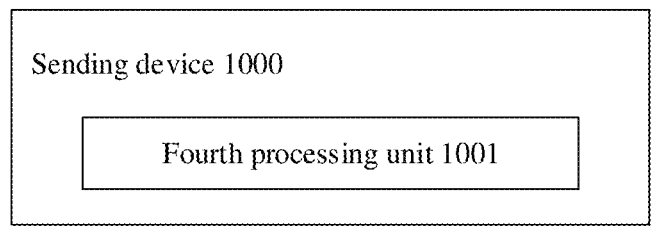
FIG. 10 is a schematic diagram of yet another optional composition structure of a sending device according to an embodiment of the present disclosure.

In order to implement the abovementioned data transmission methods, an embodiment of the present disclosure provides a sending device. A schematic structural diagram of yet another optional composition of the sending device 1000 is illustrated in FIG. 10, including a fourth processing unit 1001.

The fourth processing unit 1001 is configured to, when a second condition is satisfied, configure a first threshold determining a data transmission mode for the sending device.

In some embodiments, the second condition may include at least one of: a PDCP entity is associated with at least two RLC entities, and the at least two RLC entities correspond to different cell groups; a configured bearer is a split bearer; an IE for more than two RLC entities is configured or present; duplication transmission of more than two RLC entities is configured; a split secondary leg is configured; configuration condition for the first threshold includes Split-Bearer2; at least two of RLC entities associated with the PDCP entity correspond to different cell groups; a radio bearer is associated with more than two RLC entities, and the RLC entities correspond to different cell groups; a radio bearer is associated with at least two RLC entities, and the RLC entities correspond to different cell groups; configuration condition for the first threshold includes a split bearer, and description of the split bearer includes a radio bearer associated with at least two RLC entities, and the RLC entities corresponding to different cell groups; or configuration condition for the first threshold includes a split bearer, and description of the split bearer includes a radio bearer associated with more than one RLC entity or more than two RLC entities, and the RLC entities corresponding to different cell groups.

In some embodiments, the first threshold includes a ul-Data split threshold.

In some embodiments, the data transmission mode includes at least one of a duplication transmission mode or a split transmission mode.

An embodiment of the present disclosure further provides a sending device, including a processor and a memory having stored thereon a computer program executable by the processor, here the processor is configured to execute operations of the data transmission methods executed by the abovementioned terminal device, when executing the computer program.

An embodiment of the present disclosure further provides a chip, including a processor configured to call and execute a computer program from a memory, to enable a device mounted with the chip to execute the data transmission methods executed by the abovementioned sending device.

An embodiment of the present disclosure further provides a storage medium, having stored thereon an executable program which, when executed by a processor, implements the data transmission methods executed by the abovementioned sending device.

An embodiment of the present disclosure further provides a computer program product, including computer program instructions enabling a computer to execute the data transmission methods executed by the abovementioned sending device.

An embodiment of the present disclosure further provides a computer program, enabling a computer to execute the data transmission methods executed by the abovementioned sending device.

It should be noted that the sending device described in the embodiments of the present disclosure may be a terminal device in a communication system or a base station in the communication system.

Figure 11:
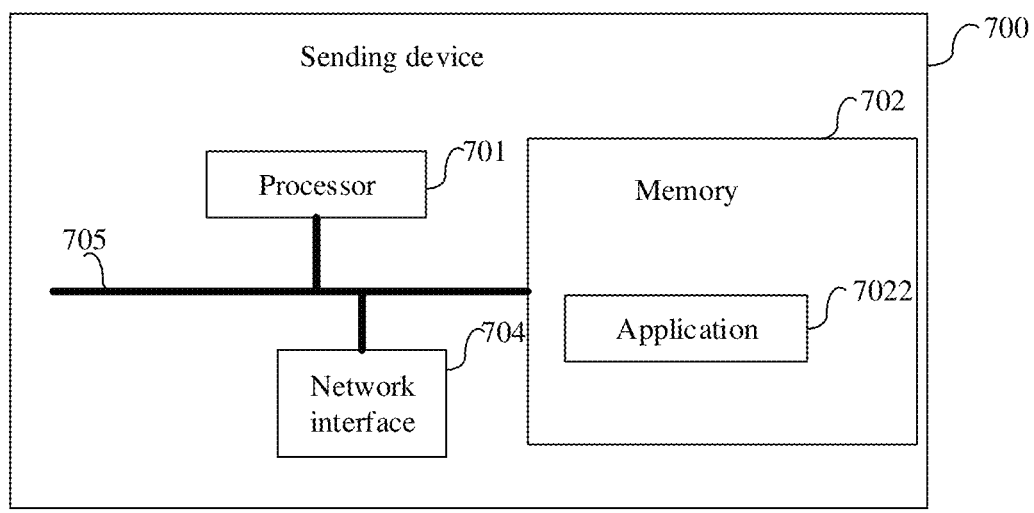
FIG. 11 is a schematic diagram of a hardware composition structure of a sending device according to an embodiment of the present disclosure.

FIG. 11 is a schematic structural diagram of a hardware composition of a sending device according to an embodiment of the present disclosure. The sending device 700 includes at least one processor 701, a memory 702, and at least one network interface 704. The components of the sending device 700 are coupled together by a bus system 705. It may be understood that the bus system 705 implements connection communication between these components. The bus system 705 includes, in addition to a data bus, a power bus, a control bus, and a status signal bus. However, for clarity of illustration, various buses are labeled as the bus system 705 in FIG. 11.

It may be understood that the memory 702 may be a volatile memory or a non-volatile memory, or may include both volatile and non-volatile memories. Here the non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, an optical disc, or a Compact Disc Read-Only Memory (CD-ROM); the magnetic surface memory may be a magnetic disk memory or a magnetic tape memory. The volatile memory may be a Random Access Memory (RAM) used as an external cache. By way of exemplary, but not limiting descriptions, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiment of the present disclosure is intended to include, but is not limited to, these and any other suitable types of memories.

The memory 702 in the embodiment of the present disclosure stores various types of data to support operations of the sending device 700. Examples of such data include any computer program operable on sending device 700, such as an application 7022. A program for implementing the methods of the embodiments of the present disclosure may be included in the application 7022.

The methods disclosed in the abovementioned embodiments of the present disclosure may be applied to or implemented by the processor 701. The processor 701 may be an integrated circuit (IC) chip with signal processing capabilities. In implementation, the operations of the abovementioned methods may be accomplished by integrated logic circuitry of hardware in the processor 701 or instructions in the form of software. The processor 701 may be a general purpose processor, a Digital Signal Processor (DSP), or another programmable logic device, discrete gate or transistor logic device, discrete hardware component, or the like. The processor 701 may implement or perform the methods, operations, and logic block diagrams disclosed in the embodiments of the present disclosure. The general purpose processor may be a microprocessor, or any conventional processor, or the like. The operations of the methods disclosed in the embodiments of the present disclosure may be directly embodied as being performed by a hardware decoding processor, or may be performed by a combination of hardware and software modules in the decoding processor. The software module may be located in a storage medium located in the memory 702, and the processor 701 reads information in the memory 702 and performs the operations of the foregoing methods in combination with its hardware.

In an exemplary embodiment, the sending device 700 may be implemented by one or more Application Specific Integrated Circuits (ASICs), DSPs, Programmable Logic Devices (PLDs), Complex Programmable Logic Device (CPLDs), Field Programmable Gate Arrays (FPGAs), general purpose processors, controllers, Micro-Control Units (MCUs), Micro-Process Units (MPUs), or other electronic components, to perform the foregoing methods.

The present disclosure is described with reference to a flowchart and/or block diagram of the method, device (system) and computer program product according to the embodiments of the present disclosure. It should be understood that each flow and/or block in the flowchart and/or block diagram, and a combination of flows and/or blocks in the flowchart and/or block diagram, may be implemented by computer program instructions. These computer program instructions may be provided to a processor of a general purpose computer, a special purpose computer, an embedded processor, or another programmable data processing device, to produce a machine, such that instructions executed by the processor of the computer or another programmable data processing device produce means implementing functions specified in one or more flows of the flowchart and/or one or more blocks of the block diagram.

These computer program instructions may also be stored in a computer readable memory capable of guiding a computer or another programmable data processing device to operate in a particular manner, such that instructions stored in the computer readable memory produce a manufactured article including an instruction device which implements functions specified in one or more flows of the flowchart and/or one or more blocks of the block diagram.

These computer program instructions may also be loaded onto a computer or another programmable data processing device, such that a series of operational operations are performed on the computer or another programmable device, to produce computer-implemented processing, therefore instructions executed on the computer or another programmable device provide operations for implementing functions specified in one or more flows of the flowchart and/or one or more blocks of the block diagram.

It should be understood that terms "system" and "network" in the present disclosure are usually used interchangeably herein. In the present disclosure, the term "and/or" is just an association relationship describing associated objects, indicating that three relationships may exist, for example, A and/or B may indicate three cases as follows: A exists alone, both A and B exist, and B exists alone. Furthermore, in the present disclosure, the character "/" generally indicates that the afore and posterior association objects have a relationship of "or".

The above description is just a preferred embodiment of the present disclosure, and is not intended to limit the scope of protection of the present disclosure. Any modifications, equivalent substitutions and improvement made within the spirit and principle of the present disclosure shall be included in the scope of protection of the present disclosure.

The invention claimed is:

1. A method for data transmission, comprising:
   when a duplication transmission state is deactivated and when a first condition is satisfied, transmitting, by a sending device, data based on a split transmission mode, or delivering, by the sending device, the data to a radio link control (RLC) entity corresponding to a primary leg or an RLC entity corresponding to a split secondary leg,
   wherein the first condition comprises the split secondary leg being configured, and duplication transmission of more than two RLC entities being configured,
   wherein an initial packet data convergence protocol (PDCP) duplication transmission state of an RLC entity associated with a data radio bearer (DRB) is a deactivation state when the duplication transmission state is not present,
   wherein the duplication transmission state is configured or present when a fourth condition is satisfied; and
   wherein the fourth condition comprises an Information Element (IE) for more than two RLC entities being configured or present.

2. The method of claim 1, wherein the first condition further comprises:
   a sum of an amount of PDCP data on the primary leg and the split secondary leg and an amount of RLC data waiting for initial transmission is greater than or equal to a first threshold.

3. The method of claim 2, wherein the first threshold is configured when a second condition is satisfied, the first threshold being used for determining a data transmission mode for the sending device, wherein the data transmission mode comprises at least one of: a duplication transmission mode or a split transmission mode;
   wherein the second condition comprises:
   at least two of RLC entities associated with the PDCP entity correspond to different cell groups;
   wherein the first threshold comprises an uplink data split threshold.

4. The method of claim 1,
   wherein the fourth condition further comprises:
   duplication transmission of more than two RLC entities is configured.

5. The method of claim 1, further comprising:
   when a third condition is satisfied, determining, by the sending device, that a leg corresponding to an RLC entity of a non-primary leg is the split secondary leg, or determining, by the sending device, that the RLC entity of the non-primary leg is a split secondary entity, the split secondary leg being used for split transmission.

6. The method of claim 5, wherein the third condition comprises:

duplication transmission of two RLC entities is configured;
wherein the two RLC entities correspond to different cell groups.

7. A sending device, comprising a processor and a memory having stored thereon a computer program executable by the processor, wherein
the processor is configured to, when a duplication transmission state is deactivated and when a first condition is satisfied, transmit data based on a split transmission mode, or deliver the data to a radio link control (RLC) entity corresponding to a primary leg or an RLC entity corresponding to a split secondary leg,
wherein the first condition comprises the split secondary leg being configured, and duplication transmission of more than two RLC entities being configured,
wherein an initial packet data convergence protocol (PDCP) duplication transmission state of an RLC entity associated with a data radio bearer (DRB) is a deactivation state when the duplication transmission state is not present,
wherein the duplication transmission state is configured or present when a fourth condition is satisfied; and
wherein the fourth condition comprises an Information Element (IE) for more than two RLC entities being configured or present.

8. The sending device of claim 7, wherein the first condition further comprises:
a sum of an amount of PDCP data on the primary leg and the split secondary leg and an amount of RLC data waiting for initial transmission is greater than or equal to a first threshold.

9. The sending device of claim 8, wherein the first threshold is configured when a second condition is satisfied, the first threshold being used for determining a data transmission mode for the sending device, wherein the data transmission mode comprises at least one of: a duplication transmission mode or a split transmission mode;
wherein the second condition comprises:
at least two of RLC entities associated with the PDCP entity correspond to different cell groups;
wherein the first threshold comprises an uplink data split threshold.

10. The sending device of claim 7,
wherein the fourth condition further comprises:
duplication transmission of more than two RLC entities is configured.

11. The sending device of claim 7, wherein
the processor is further configured to, when a third condition is satisfied, determine that a leg corresponding to an RLC entity of a non-primary leg is the split secondary leg, or determine that the RLC entity of the non-primary leg is a split secondary RLC entity, the split secondary leg being used for split transmission.

12. The sending device of claim 11, wherein the third condition comprises:
duplication transmission of two RLC entities is configured;
wherein the two RLC entities correspond to different cell groups.

* * * * *